United States Patent [19]

Sato et al.

[11] Patent Number: 4,766,034
[45] Date of Patent: Aug. 23, 1988

[54] MAGNETIC RECORDING MEDIUM

[75] Inventors: Toshihiko Sato; Takeshi Kitamura; Shinsaku Nagaoka, all of Hino, Japan

[73] Assignee: Konishiroku Photo Industry Co., Ltd., Tokyo, Japan

[21] Appl. No.: 132,681

[22] Filed: Dec. 14, 1987

[30] Foreign Application Priority Data

Feb. 16, 1984 [JP] Japan .................. 59-27714

[51] Int. Cl.⁴ .................. H01F 10/08; H01F 10/16
[52] U.S. Cl. .................. 428/336; 428/469; 428/694; 428/900; 427/130; 427/131; 427/132; 204/192.2
[58] Field of Search .................. 428/694, 900, 469, 336; 427/130, 131, 132; 204/192.2

[56] References Cited

U.S. PATENT DOCUMENTS

| | | | |
|---|---|---|---|
| 3,829,372 | 8/1974 | Heller | 204/192 M |
| 4,239,835 | 12/1980 | Iijima et al. | 428/457 |
| 4,323,629 | 4/1982 | Kunieda et al. | 427/132 |
| 4,385,098 | 5/1983 | Sugita et al. | 428/701 |
| 4,411,953 | 10/1983 | Miyoshi et al. | 428/694 |
| 4,511,635 | 4/1985 | Nagao et al. | 428/900 |
| 4,521,482 | 6/1985 | Arai et al. | 428/900 |
| 4,554,217 | 11/1985 | Grimm et al. | 428/900 |
| 4,596,735 | 6/1986 | Noguchi et al. | 428/694 |
| 4,661,418 | 4/1987 | Yanai et al. | 428/611 |

FOREIGN PATENT DOCUMENTS

| | | | |
|---|---|---|---|
| 75499 | 7/1978 | Japan | 204/192 M |
| 41439 | 3/1983 | Japan . | |
| 66106 | 4/1984 | Japan . | |

OTHER PUBLICATIONS

Japio Abstract #83-208935, Regarding J58208935 of Dec. 5, 1983.

Primary Examiner—George F. Lesmes
Assistant Examiner—William M. Atkinson
Attorney, Agent, or Firm—Jordan B. Bierman

[57] ABSTRACT

A magnetic recording medium comprising a magnetic metal layer on a substrate. The uppermost layer of the magnetic metal layer consists essentially of a mixture of a magnetic metal such as Co or Co-Ni alloy and an oxide thereof. The surface portion of the magnetic layer consists essentially of a crystal phrase of said oxide and the ratio of oxide forming metallic atoms decreases continuously with the depth from the outer surface.

12 Claims, 5 Drawing Sheets

MAGNETIC RECORDING MEDIUM

This application is a continuation of application Ser. No. 699,859, filed Feb. 8, 1985, now abandoned.

BACKGROUND OF THE INVENTION

1. Field of the Invention

The present invention relates to a thin film type magnetic recording medium and more particularly to a thin film type magnetic recording medium with an improved abrasion resistance and corrosion resistance.

2. Prior Art and its Drawback

The manufacturing method of a magnetic recording medium may roughly be classified into two categories from the viewpoint of a forming method of a magnetic layer; one is a coating method and the other is a method of evaporation or of plating.

In the magnetic recording medium prepared by the coating method (hereafter, a magnetic recording medium prepared by the coating method is referred to as "a coating type magnetic recording medium"), ferromagnetic powder such as $\gamma$-$Fe_2O_3$, Fe or the like is mixed with optimum binder resin and magnetic paint obtained after dispersion is coated on a non-magnetic substrate and then the processes such as magnetic orientation, drying, super-calendering and others are conducted thereon, thus the characteristics as a magnetic recording medium are obtained.

Even the coating type magnetic recording medium naturally requires a high coercive force, an improvement of the recording density, a thin film of magnetic layer and others. However, the method wherein the magnetic paint obtained by mixing ferromagnetic powder with binder is coated on a non-magnetic substrate has essentially the limit in the substantial containing rate of ferromagnetic powder and thus it has difficultly for aiming the high recording density and thin film.

For aforesaid reasons, there have been employed generally two methods for the aim of high recording density and thin film; one method is to cause magnetic materials to evaporate with a method such as vacuum deposition, sputtering, ion plating or the like so that the magnetic materials form a continuous thin film on a non-magnetic substrate and the other method is to form through an electrolytic method or a chemical plating (hereafter, a magnetic recording medium obtained through aforesaid methods is referred to as "a thin film type magnetic recording medium"). In the thin film type magnetic recording medium, it is possible to obtain the one having a high recording density characteristic in the short wavelength zone such as high density and thin film etc. which is not owned by aforesaid coating type magnetic recording medium.

However, the thin film type magnetic recording medium generally requires an improvement both in physical and chemical characteristics such as corrosion resistivity, abrasion resistance or the like and in an electromagnetic characteristic thereof.

For the improvement in physical and chemical characteristics of the thin film type magnetic recording medium prepared through aforesaid vacuum deposition, sputtering or ion plating etc., there have been proposed various methods. For example, (1) an over coat layer of abrasion proof metal is disclosed in Japanese Patent Publication Open to Public Inspection Nos. 23704/1976, 47401/1976, 7205/1978, 39708/1978, 73108/1978 and 141107/1979, (2) an over coat layer of metallic oxide, metallic nitride or of metallic carbide being disclosed in Japanese Patent Publication Open to Public Inspection Nos. 4805/1977, 127204/1977 and 138054/1982, (3) an over coat layer of inorganic lubricant being disclosed in Japanese Patent Publication Open to Public Inspection Nos. 146302/1975 and 57002/1978 and (4) the one wherein an organic polymer superficial film is formed is disclosed in Japanese Patent Publication Open to Public Inspection Nos. 153707/1977, 153534/1981, 8927/1982, 130436/1983 and 150128/1983. Further, (5) the one wherein organic lubricant such as fatty acid or esters of higher alcohol is coated or adsorbed is disclosed in Japanese Patent Publication Open to Public Inspection Nos. 93533/1980 and 19736/1983 and further, (6) the one wherein an oxide film or a nitride film is formed through oxidation or nitriding on the surface of a magnetic layer is disclosed in Japanese Patent Publication Open to Public Inspection Nos. 33806/1975, 153407/1977, 143111/1979, 15011/1981 and 26321/1983.

In the aforesaid prior arts, however, (1), (2), (3) and (4) require the film thickness of 0.1 $\mu$m or more for the good effect on both corrosion resistance and abrasion resistance and such film thickness disables to obtain a sufficient capability as a high density recording medium due to the spacing loss produced therein. Further, due to the film formed additionally, the adhesive force between the magnetic layer and the film is insufficient, which causes the exfoliation between layers to take place easily, thus the abrasion resistance is especially problematic. Further in (5), the lubricant film easily comes off and easily be worn away therefore the characteristics such as the durability for the still and others have not been sufficient. Further in (6), the method is not suitable for the magnetic recording medium for video which employs a plastic substrate such as polyester or the like because the temperature goes up in the manufacturing stage owing to its method wherein oxidation and nitriding are performed with heat or kinetic energy of particles being added. Further in the wet system method wherein a solution reaction is employed, if a film having the practical characteristic is prepared, the thickness of the film tends to be thick that results in a spacing loss and if the film thickness is thin, on the contrary, the sufficient abrasion resistance can not be obtained and at the same time, the secondary problem such as the acceleration of corrosion or the like has been produced.

SUMMARY OF THE INVENTION

Objects of the Invention

The present invention has been devised to solve aforesaid problems and the primary object of the present invention is to provide a magnetic recording medium which is excellent in its physical and chemical characteristics such as corrosion resistance, abrasion resistance and others.

Secondary object of the present invention is to provide a magnetic recording medium whose output level is high and noise level is low, resulting in an excellent C/N ratio.

Concrete Structure of the Invention

Aforesaid objects of the present invention are attained by a magnetic recording medium comprising:

A magnetic recording medium comprising a substrate and a magnetic layer which has an uppermost layer consisting essentially of a mixture of a magnetic metal and an oxide thereof, wherein the surface portion of said uppermost layer consists essentially of a crystal phase of said oxide and the proportion of magnetic metal atoms forming said oxide to the total number of magnetic metal atoms continuously decreases in said uppermost layer with the depth from the surface.

In the magnetic recording medium of the present invention, the surface portion of the uppermost mixture layer consists essentially of the crystal phase of the magnetic metal oxide and the oxide satisfying stoichiometry such as $CoO$, $Co_3O_4$, $NiO$, $Ni_3O_4$ or the like (oxide of other atoms in extremely small quantities may be contained) exist being mixed when the magnetic metal, for example, is Co—Ni alloy and thus the crystal phase of said oxide is formed. Even in the case that the magnetic metal is other alloy or a metal of simple substance, magnetic metal oxide satisfying stoichiometry exist like aforesaid case of Co—Ni alloy at the level of concentration similar to the foregoing. The crystal phase in the surface portion of the uppermost mixture layer is confirmed and regarded as a crystal phase of oxide, as will be stated later, through the means such as X-ray diffraction, electron-beam diffraction or the like wherein the comparison with the data of standard samples is made.

The surface portion is composed of crystal phase of oxide which is physically and chemically stable and therefore, that is excellent in both abrasion resistance and corrosion resistance and thus it causes the abrasion resistance and corrosion resistance of a magnetic recording medium to be improved. The thickness of the surface portion composed of crystal phase of oxide may be up to the level of thickness corresponding to several molecules, while the crystal phase of oxide is formed under the control of such as the supplying speed of the oxide and others and confirmed through aforesaid means.

Within the mixture layer, metallic oxide satisfying stoichiometry exist together with magnetic metal and the ratio $\alpha$ of the number of atoms of oxide-forming metal to the total number of magnetic metal atoms decreases continuously with the depth from the surface of the uppermost mixture layer. The depth in the direction of film thickness of the uppermost mixture layer corresponding to the value of 0.5 of aforesaid $\alpha$ in the mixture layer is preferably 105 Å–150 Å practically and the range of 115 Å–135 Å is more preferable.

Aforesaid mixture layer in the present invention does not mean a counter diffusion region or a layer which has much different characteristics or composition formed on the ordinary magnetic layer through the different method such as heat treating or coating etc. It means the one wherein the mixture ratio of the metal to the metallic oxide satisfying stoichiometry is intentionally controlled in the uppermost layer when the magnetic layer is formed. It is preferable that the thickness of the magnetic layer is in the range of 500 Å–5000 Å and the thickness of the mixture layer is in the range of 5%–35% of aforesaid magnetic layer and the slope of the change in the composition ratio is continuous and gentle (e.g. 80% per 100 Å).

Since the surface portion of the mixture layer is composed of crystal phase of magnetic metal and its oxide, the mixture layer has the function as a protective layer and thus the abrasion resistance is improved. Further, in the mixture ratio in the vicinity of the surface portion, the percentage of magnetic metal oxide satisfying stoichiometry is greater thereby the protection function is reinforced, while, the percentage of magnetic metal oxide decreases as the position in the mixture layer approaches the substrate and thereby the percentage of magnetic metal increases contributing to the increase of the output level of a magnetic recording medium. Furthermore, at the substrate side in the mixture layer, extremely small amount of magnetic metal oxide exist in the magnetic metal, which inhibits the growth of the crystalline particles of magnetic metal thus contributing to minimization of particles resulting in the realization of the remarkable improvement in the C/N of a magnetic recording medium.

Incidentally, in the magnetic recording medium of the present invention, the mixture ratio of the magnetic metal to the magnetic metal oxide in the mixture layer in the range up to 400 Å–500 Å of the maximum depth from the surface of the magnetic layer in the direction of the film thickness is stipulated an neither the structure of the magnetic layer in the deeper region is stipulated nor the known structure such as a lamination layer of magnetic layer or a lamination layer of non-magnetic layer or the like, for example, is excluded.

DETAILED DESCRIPTION OF THE INVENTION

For the magnetic recording medium of the present invention, known methods such as vacuum deposition (including reactive deposition), sputtering, ion plating, CVD (Chemical Vapor Deposition) and others are given as a method for forming the magnetic layer on a non-magnetic substrate. A method of electron-beam reactive deposition among them is preferable.

As a magnetic metallic material capable of being used for the magnetic recording medium of the present invention, magnetic metal such as Fe, Co, Ni and others or an alloy type magnetic metal such as Fe—Co, Fe—Ni, Co—Ni, Fe—Si, Fe—Rh, Fe—V, Fe—Cu, Fe—Au, Co—P, Co—V, Co—Si, Co—Y, Co—La, Co—Ce, Co—Pr, Co—Sm, Co—Mn, Co—Pt, Ni—Cu, Co—Ni—Fe, Co—Ni—Ag, Co—Ni—Zn, Co—Si—Al, Fe—Si—Al, Mn—Bi, Mn—Sb, Mn—Al and others are given. Co or Co—Ni alloy (Ni content: not exceeding 30% by weight) among them is preferable. Incidentally, other ingredients in an extremely small amount may be contained at need.

As a non-magnetic substrate, plastic substrates normally used such as polyethylene terephthalate, polyethylene-2,6-naphthalate, polycarbonate, polypropylene, cellulosetriacetate, polyimide, aramid, polyparavanic acid and others are given and polyethylene terephthalate among them is preferable.

For the purposes of the improvement in lubrication, antistatic function, transfer-prevention, improvement in preservation and improvement in abrasion resistance, an over-coat layer or a back-coat layer may be provided on the substrate of the magnetic recording medium of the present invention through the known coating method or deposition method after and/or before the formation of aforesaid magnetic layer. These coating method and deposition method are disclosed in Japanese Patent Publication Open to Public Inspection Nos. 123922/1979, 123923/1979, 71284/1981, 71286/1981, 71287/1981, 11626/1981 and 135442/1982.

As materials of an over-coat layer and a back-coat layer, various polymers (e.g. urethane resins, epoxy resins, copolymer of vinyl chloride and vinyl acetate), various organic oligomers and polymers such as silicone resins and others both as a binder and various materials such as inorganic materials of carbonblack and alumina or the like, an antioxidant such as a phenol derivative and others and low molecular weight organic compound such as singlet-oxygen-quencher like an amine derivative each as an additive, may be used and furthermore, various ingredients such as a lubricant, an abrasive, antistatic agent and a dispersant may be added for the composition.

Figure 1:
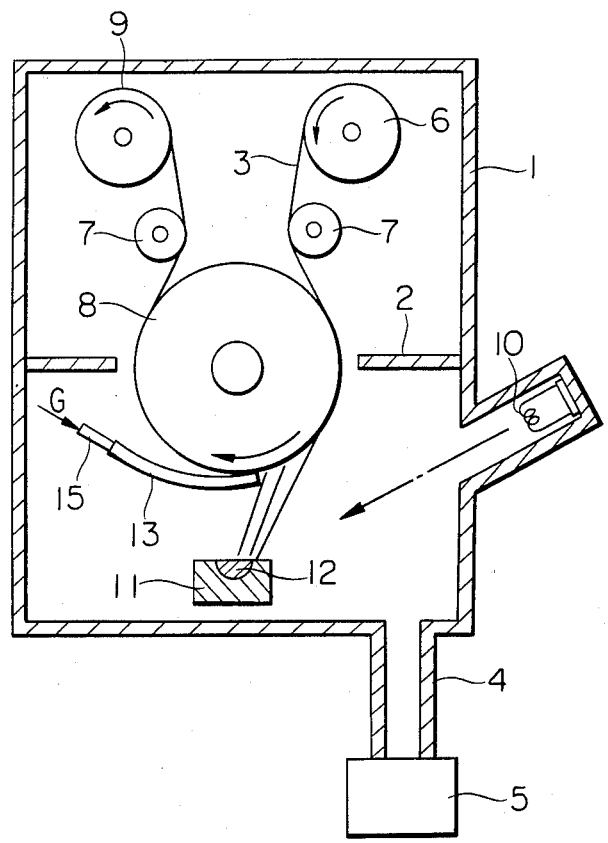
FIG. 1 is a sectional view of the main part of the apparatus used for the manufacture of the magnetic recording medium of the presen invention.
Figure 2:
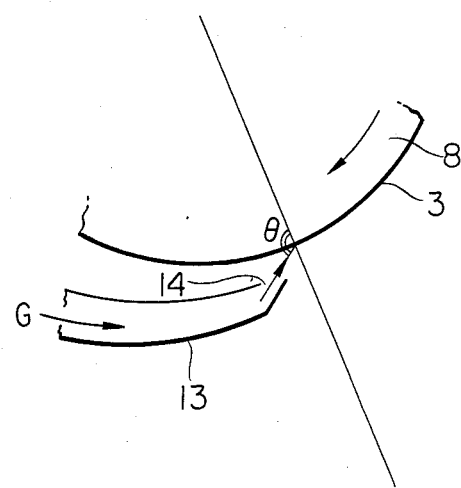
FIG. 2 is a schematic diagram showing the direction of ejection of reactive gas toward the substrate.

FIG. 1 shows a sectional view of the main part of an example of the apparatus used for manufacturing the magnetic recording medium of the present invention.

The inside of the apparatus is totally sealed airtight by means of a casing marked with a numeral 1 and the casing 1 is divided by means of a partitioning wall 2 into two portions which include a chamber where a non-magnetic substrate 3 is forwarded and taken up and a deposition chamber and on the bottom of the casing 1, there is provided an exhaust pipe 4 which is connected to the vacuum-exhauster 5.

The substrate-winding/rewinding-up chamber is provided with a forwarding shaft 6, two pieces of free roller 7, a substrate-supporter 8 and a take-up shaft 9. In the deposition chamber, there are provided an electron beam generator 10, a pot 11 and magnetic materials for deposition contained in the pot. There is further provided the mask 13 that protrudes in the flying space formed between the substrate-supporter 8 and the pot 11, thereby the angle of incidence of flying vapor flow of magnetic materials 12 against the substrate 3 may be controlled. The mask 13 is hollow in its structure and in the vicinity of the incidence angle-controlling tip thereof, there is provided a slit-shaped nozzle 14 whose longer side is in the direction of the width of the substrate 3 set around the substrate-supporter 8, thereby the gas G is introduced through the introduction pipe 15 for reactive gas such as oxygen gas and others and then is ejected from the slit-shaped nozzle 14 against the substrate 3 with a desired angle. Regarding the ejection angle of the reactive gas, it is preferable that the angle between a normal line at the position where ejected gas hits the substrate 3 on the surface of the substrate and the ejection direction of the gas is 90° or more and the range between 140° and 180° is more preferable. Further, the distance between the nozzle 14 and the surface of the substrate is preferably 15 mm or less and more preferably is 3-10 mm.

The optimum values of the speed and quantity of ejected gas as well as of the width of the slit of the nozzle 14 are correlatively determined and the width of the slit is preferably 5 mm or less and more preferably is 0.5-2 mm, while the speed and quantity of ejected gas per 10 cm of the slit width is preferably $2 \times 10^{-2} - 0.5$ Pa cm$^3$/s. In this case, a tank may be provided between the introduction pipe 15 and the introduction inlet for the purpose of improving the uniforming of the speed and quantity of the ejected gas.

Cooling mechanisms and others in the substrate-supporter and mask are not shown but the known technology in the industry may naturally be employed freely and selectively.

In the example, the electron-beam-heating method is used but the methods of resistance-heating, laser-beam-heating and others may also be used.

Reactive gas to be used for the present invention has only to be gases containing at least one kind selected from oxygen, an allotrope of oxygen and active type of oxygen and as other gases capable of being used together with aforesaid gas, inactive gases such as nitrogen ($N_2$) gas, helium gas (He), xenon gas (Xe), radon gas (Rn), argon gas (Ar) and neon (Ne), carbon monoxide (CO), carbon dioxide ($CO_2$), hydrogen ($H_2$) and aqueous vapor ($H_2O$) may be used independently or as a mixture of two kinds or more of them.

For the component analysis of the magnetic layer, an Auger spectrum analysis, ESCA (Electron Spectroscopy of Chemical Analysis) and a means of X-ray diffraction are generally used. In the Auger spectrum analysis, however, the status of combination of atoms in not clear though it is possible to analyze the composition of the atoms forming the film. For example, it is not possible to discriminate whether oxygen atoms exist as molecules of magnetic metal oxides or they are contained in the film in the form of free oxygen molecule, which is a present status of the technology. In the magnetic recording medium of the present invention, the composition of the magnetic metal and the oxide of aforesaid metal (satisfying stoichiometry) is obtained through ESCA at the depth in the film-thickness direction in each sample, the outline of which is explained below.

Figure 3:
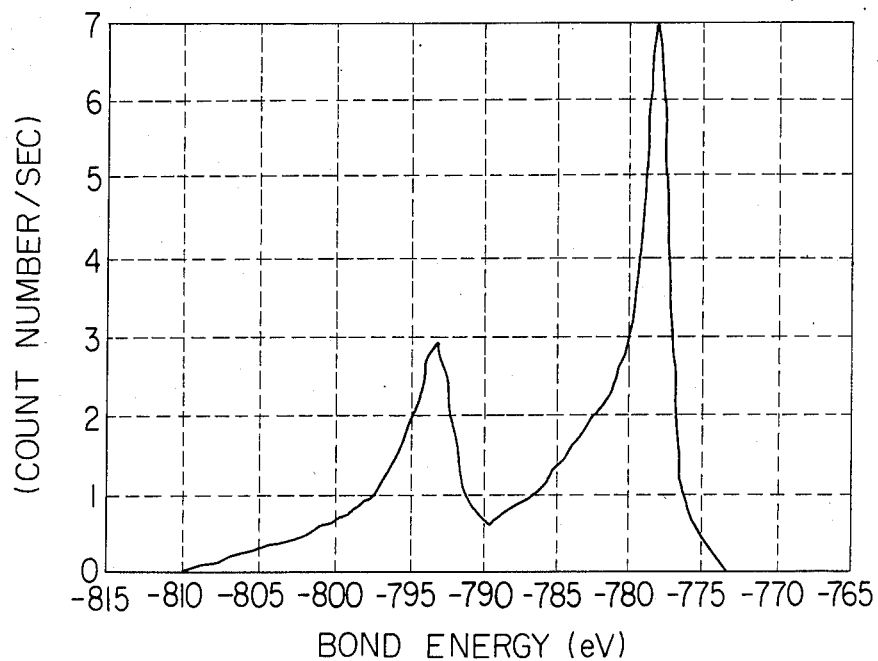
FIG. 3 shows a standard spectrum of metallic cobalt relating to the ESCA measurement and FIG. 4 shows a standard spectrum of cobalt oxide.
Figure 4:
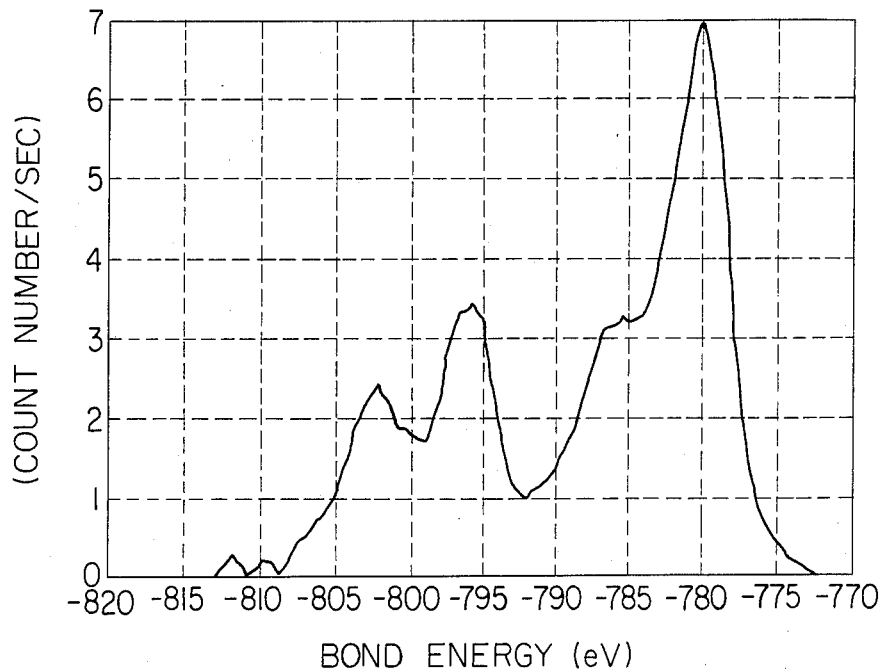

It is possible to obtain through ESCA the information about oxidation status of metals. Regarding Co, for example, the information whether said Co is in the metallic status or in the oxidized status may be obtained through the measurement of signals based on 2p photoelectrons. For the analysis performed in the direction of the film-thickness of the sample, the measurement is made through ESCA at each depth of the film after the etching conducted by an argon-ion gun. The conditions for etching, for example, are 5 kV, 25 mA and 8 mm raster and for the Co—Ni alloy with a known thickness, the etching speed for that is about 12 Å/min. In the example wherein metallic cobalt is employed as a magnetic metal, the method of obtaining the composition ratio of the metal and the metallic oxide in the magnetic layer of the sample of magnetic recording medium obtained is as follows. ESCA spectrum of the standard sample is to be obtained first. In the concrete manner, after the surface of the standard sample made of pure metal of cobalt is cleaned by sufficient etching, the standard spectrum (shown in FIG. 3) of the metallic cobalt is obtained through the ESCA measurement. Next, the standard spectrum (shown in FIG. 4) is obtained in the same manner even for the cobalt oxide (CoO). (Incidentally, the spectrum shown in each of FIG. 3 and FIG. 4 is the spectrum of Co2p after the correction of the base-line.) From the comparison between FIG. 3 and FIG. 4, it is possible to observe clearly the shifting of peak position (chemical shift) and the difference in the peak form. Here, we assume that the sensitivity (count number of photo-electron signal per unit number of atoms) of metallic cobalt is mostly the same as that of cobalt oxide and assume that the spectrum of the mixture of metallic cobalt and cobalt oxide is identical to the one obtained in the manner wherein each standard spectrum of metallic cobalt and cobalt oxide is multiplied by the mixture ratio thereof and then is added together. Here, it is possible to stipulate the one obtained in the manner that each standard spectrum of both metallic cobalt and cobalt oxide is multiplied by the optimum constant corresponding to each mixture ratio and then added together as the standard spectrum at each mixture ratio and thus the mixture ratio of metallic cobalt and cobalt oxide may be estimated through the comparison between the aforesaid standard spectrum and the spectrum at each depth of the film of the sample. Incidentally, CoO only is shown for the standard spectrum of cobalt oxide due to the consideration that other ingredient $Co_2O_3$ as cobalt oxide is negligible from the results of analysis such as X-ray diffraction and ESCA spectrum, thus cobalt oxide is considered here to be the single compound of CoO.

Further, when the Co—Ni alloy is used as a magnetic metal, the standard spectrum is to be prepared even for the Ni metal in the same manner as the foregoing where a simple substance of Co metal is the subject, and thereby the mixture ratio of the metal to the metal oxide may be estimated through the comprehensive evaluation of Co and Ni. In the same method as the foregoing, the same thing may also be performed for the other metal and alloy.

CONCRETE EXAMPLE OF THE INVENTION

The present invention will be explained as follows referring to the examples and the comparative example which are not intended as a definition of the limits of the invention.

EXAMPLE 1

The magnetic recording medium was prepared under the following conditions using the apparatus shown in FIG. 1 and providing the slit-shaped nozzle for oxygen gas in the vicinity of the tip of the mask that controls the incidence angle of flying atmospheric current.
ejecting quantity of oxygen gas 1.0 l/min
gas-ejecting angle $\theta = 170°$
distance between nozzle and substrate 7.0 mm Under the pressure of $7 \times 10^{-3}$ Pa, the magnetic material of Co—Ni (80:20) was evaporated through the heating by electron beam and at the same time, oxygen gas was ejected from the nozzle while the polyethylene terephthalate substrate with a thickness of 12.5 μm was running at the speed of 50 m/min, thus the magnetic layer with a thickness of 1200 Å was formed. After the magnetic layer was formed, an example tape 1 was prepared by coating the ester-type lubricant on the surface of the tape to the thickness of about 100 Å and by slitting the master web of magnetic recording medium into the tape with a width of 12.65 mm.

Figure 5:
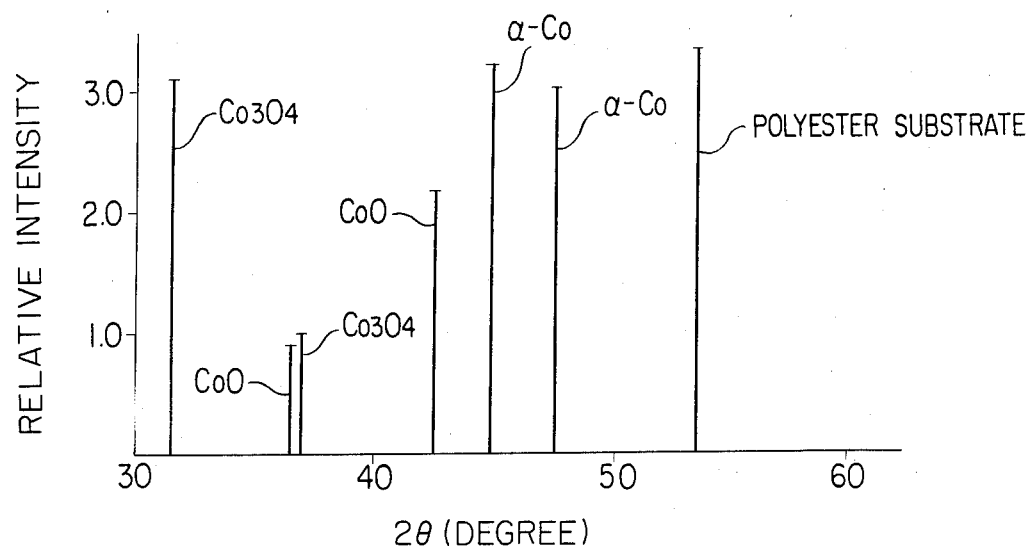
FIG. 5 is an X-ray diffraction spectrum of the magnetic layer obtained in the present invention.
Figure 6:
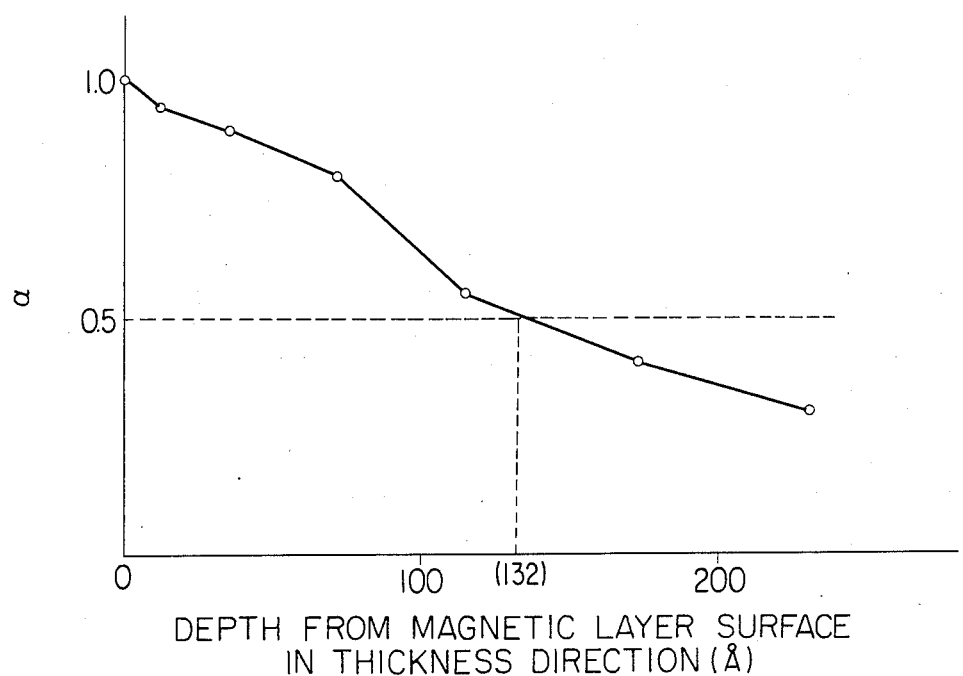
FIG. 6 shows a graph of $\alpha$ values in the magnetic layer obtained through the ESCA measurement.

The ratio $\alpha$ of the number of atoms of oxide-forming metal to the number of atoms of total metals forming the metal and metallic oxide at each depth in the direction of film thickness in the example tape 1 was obtained through the ESCAP measurement. The apparatus used for the ESCA measurement was PHI Model 560 type ESCA/SAM made by Perkin-Elmer Co. and an Al anode was used therein and the condition of 15 kV and 300 W was employed. As the energy resolving power, pass energy of 25 eV was used. Etching, on the other hand, was performed by means of an argon-ion gun and the etching speed was about 12 Å/min for Co—Ni alloy. The results of the ESCA measurement are shown in FIG. 6. It is understood that the rate of oxide decreases as the position goes away from the surface (where the rate of oxide is 100%). Further, the X-ray diffraction spectrum pattern of the magnetic tape obtained after the formation of the magnetic layer and before the coating of the lubricant is shown in FIG. 5.

Furthermore, example tapes 2-5 were prepared under the same condition as the foregoing except that the ejecting quantity of oxygen gas was changed to 0.75 l-1.2 l/min.

Figure 7:
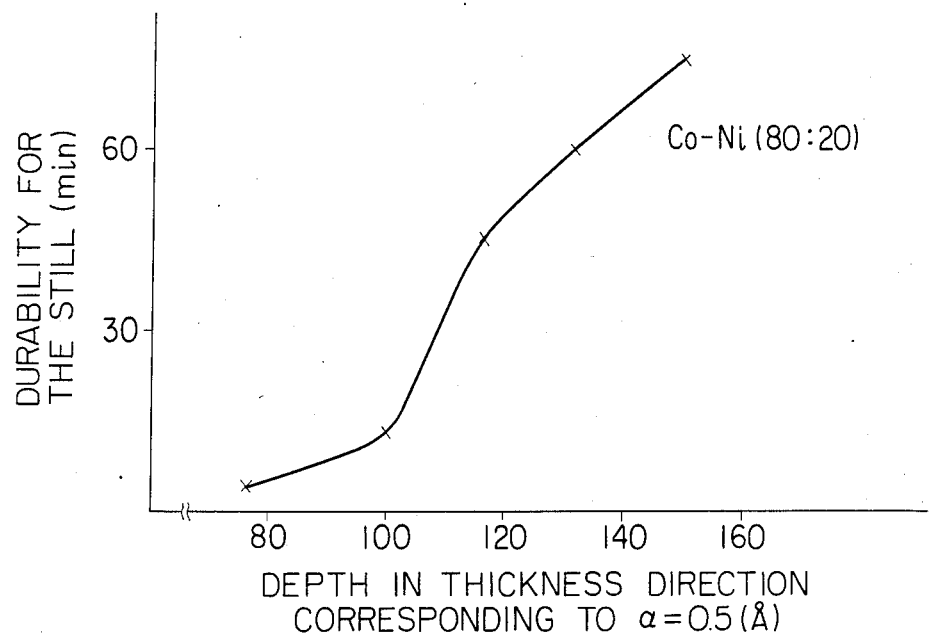
FIG. 7 is a graph showing the relation between the position of 0.5 in terms of $\alpha$ in the magnetic layer wherein Co—Ni (80:20) alloy is employed and the durability for the still

The ESCA measurement was performed on the example tapes 2-5 in the same manner as the example tape 1 and the depth in the film thickness corresponding to the aforesaid $\alpha$ that is 0.5 was obtained. The durability for the still for each tape sample obtained was measured with the use of the VTR tape deck on the market. For the measurement of the durability for the still frame life, the period of time that causes the output to drop by 3 dB was obtained in the unit of a minute under the back tension of 12 g. The results obtained are shown in FIG. 7 wherein the values obtained from tape samples are plotted on the abscissa and the values of the durability for the still corresponding to aforesaid values are plotted on the ordinate with a position at the depth in the film thickness direction from the magnetic surface corresponding to the aforesaid $\alpha$ of 0.5 as an index.

EXAMPLE 2

Figure 8:
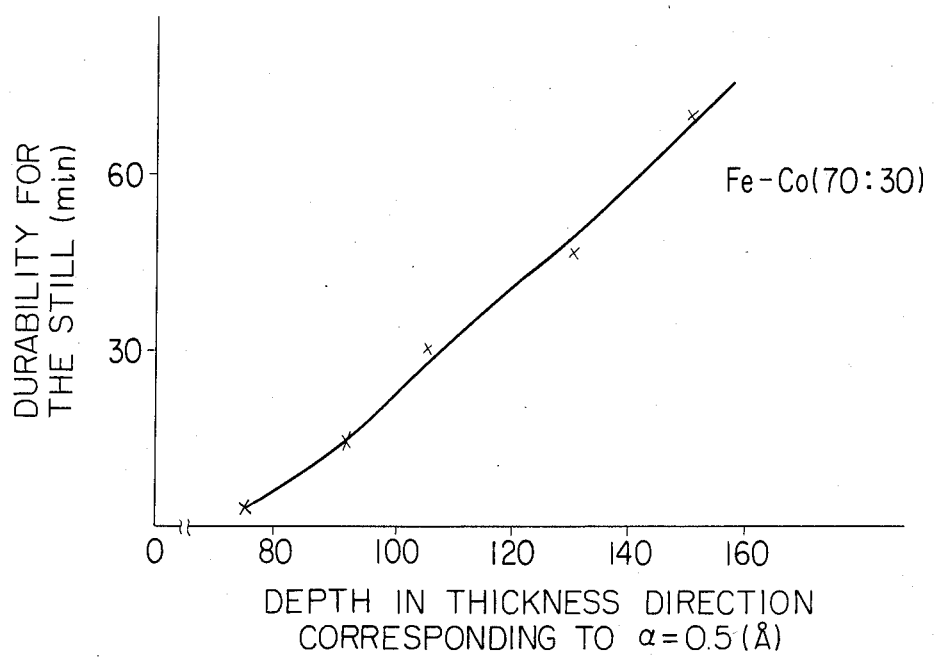
FIG. 8 is for the occasion where Fe—Co (70:30) alloy is used

In the same manner as the example 1 except that Fe—Co (70:30) alloy was used as a magnetic material, example tapes 6-10 in 5 kinds were obtained. The durability for the still for each of the examle tapes 6-10 was measured in the same manner as the example 1 and positions in terms of depth in the film thickness direction corresponding to the value of aforesaid $\alpha$ that is 0.5 were obtained through the ESCA measurement. The results thereof are shown in FIG. 8.

EXAMPLE 3

Figure 9:
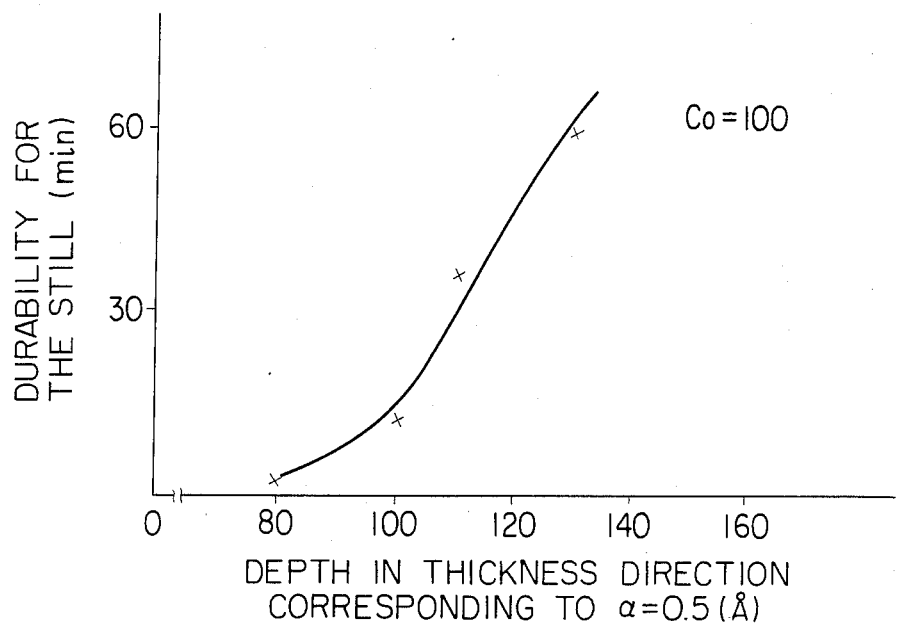
FIG. 9 is for the use of Co metal.

Example tapes 11-15 in 5 kinds were obtained in the same manner as the example 1 with an exception that Co metal was used as a magnetic material. The durability for the still for each of the example tapes 11-15 was measured in the same manner as the example 1 and positions in terms of depth in the film thickness direction corresponding to the value of aforesaid $\alpha$ that is 0.5 were obtained through the ESCA measurement. However, the ejecting quantity of oxygen gas was 2.5 kg/cm² 0.75 l-1.0 l/min. The results thereof are shown in FIG. 9.

Judging from the foregoing, it is desirable that the position in terms of depth in the film thickness corresponding to aforesaid α of 0.5 is practically greater than about 105 Å.

EXAMPLE 4

Example tapes 16-21 in 6 kinds were obtained in the same manner as the example 1 with an exception that Co—Ni (80:20) alloy was used, the thickness of the magnetic layer was 800 Å and the ejecting quantity of oxygen gas was fixed to the one point in the range of 2.5, 0.8 1-1.4 l/min.

Figure 10:
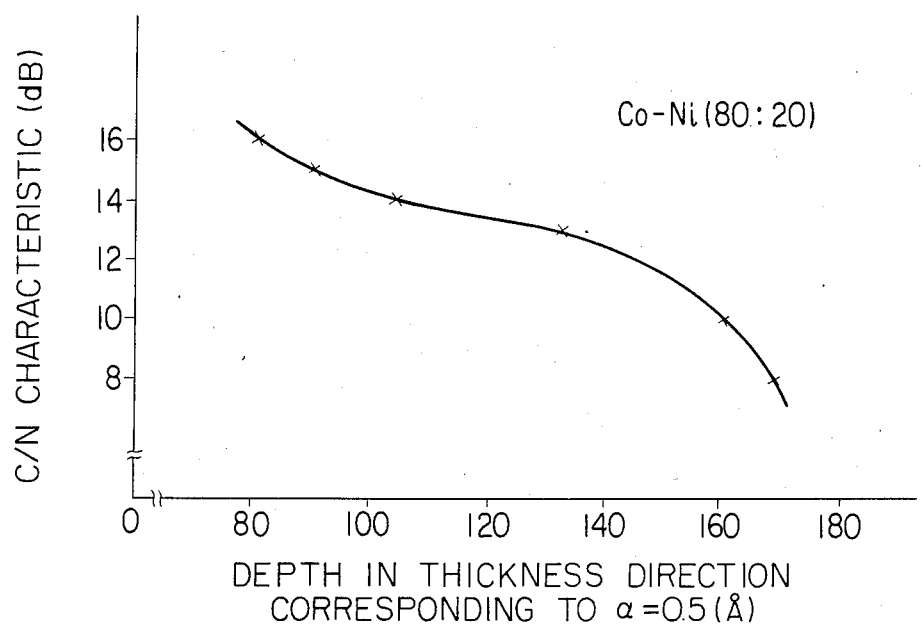
FIG. 10 is graph showing the relation between the position of 0.5 in terms of $\alpha$ in the magnetic layer wherein Co—Ni (80:20) alloy is used and the C/N characteristic.

The C/N characteristic at 5 MHz was measured for each of the example tapes 16-21 obtained. In addition to that, the positions in terms of depth in the film thickness direction in the magnetic layer corresponding to the value of aforesaid α of 0.5 were obtained. Incidentally, the C/N was shown with a value corresponding to 0 dB of ½ inch β employing cobalt-iron oxide (TDK, L=500). The results thereof are shown in FIG. 10.

Judging from the foregoing, it is practically desirable that the position in terms of depth in the film thickness corresponding to aforesaid α of 0.5 is about 150 Å at the best.

COMPARATIVE EXAMPLE 1

After the magnetic layer was formed by using Co—Ni (80:20) alloy as a magnetic material and by introducing no oxygen gas until the film thickness reaches 700 Å, oxygen gas was introduced and further the oxide layer with a thickness of 400 Å was formed, thus the master web of tape having totally the magnetic layer of 1100 Å was obtained. Further, the ester-type lubricant was coated on the master web to the thickness of about 100 Å and then the master web was slitted, thus the comparative example tape 1 was obtained. The durability for the still and the C/N characteristic at 5 MHz were measured on the comparative example tape 1 obtained. The results thereof are shown in the following table.

TABLE

| | durability for the still | C/N at 5 MHz |
|---|---|---|
| comparative example tape 1 | 30 sec | +8 dB |

The contents of the table show that the counter diffusion layer provides no effect of the present invention.

What is claimed is:

1. A magnetic recording medium comprising a substrate and, directly provided thereon, a magnetic metal layer which has an uppermost layer consisting essentially of a mixture of a magnetic metal and an oxide thereof,
   wherein said magnetic metal is Co or Co—Ni alloy of which Ni content is less than 30% by weight,
   and wherein the surface portion of said uppermost layer consists essentially of a crystal phase of said oxide,
   and wherein the ratio of oxide-forming metallic atoms to the total number of metallic atoms decreases continuously with the depth from the outer surface of said uppermost layer and becomes approximately 0.5 in a region from 105 Å-150 Å of the depth from said surface.

2. The magnetic recording medium according to claim 1, wherein said ratio is approximately 0.5 where the depth from the surface of said magnetic layer is in the range from 115 Å to 135 Å.

3. The magnetic recording medium according to claim 1, wherein said magnetic layer is formed by means of a method of vacuum deposition, sputtering, ion plating, chemical vapor deposition or of electron beam reactive deposition.

4. The magnetic recording medium according to claim 1, wherein said magnetic recording medium has a non-magnetic overcoat layer.

5. The magnetic recording medium according to claim 1, wherein said oxide is CoO.

6. The magnetic recording medium according to claim 1 wherein said magnetic recording medium has a backing layer comprising organic oligomers and polymers, inorganic carbon black and alumina or antioxidants.

7. The magnetic recording medium of claim 1 wherein the surface portion of said uppermost layer consists essentially of said oxide in which the ratio of oxide-forming metallic atoms to the number of metallic atoms is essentially 1.

8. A process for the production of a magnetic recording medium which comprises a substrate and a magnetic layer having an uppermost layer consisting essentially of a mixture of a magnetic metal and a oxide thereof, in which the surface portion of said uppermost layer consists essentially of a crystal phase of said oxide, and the ratio of magnetic metal atoms forming said oxide to the total number of magnetic metal atoms continuously decreases in said uppermost layer with the depth from the outer surface and becomes 0.5 in a region from 105 Å to 150 Å of the depth from said surface, comprising
   supporting and forwarding said substrate with a drum-shaped substrate-supporting member,
   depositing a vapor of said magnetic metal by vacuum deposition on a surface of said substrate in a direction controlled by a mask in a flying space of said magnetic metal vapor, said mask being hollow in and having a slit-shaped nozzle facing said substrate surface along its front edge, said nozzle being placed at a distance of 3 to 10 mm from said substrate surface, and
   introducing a reactive gas through said nozzle to said substrate surface to deposit the magnetic metal vapor thereon, at an angle from 140° to 180° to a normal line at the position where said gas hits the surface of the substrate supported on the drum-shaped supporting member.

9. The process according to claim 8 wherein said gas is selected from the group consisting of nitrogen, helium, xenon, argon, neon, carbon monoxide, carbon dioxide, hydrogen, and aqueous vapor.

10. The process according to claim 8 wherein said reactive gas is selected from the group consisting of oxygen, an allotrope of oxygen, and activated oxygen.

11. The process according to claim 8 wherein said magnetic metal is selected from the group consisting of Fe, Co, Ni, Fe—Co alloy, Fe—Ni alloy, Co—Ni alloy, Fe—Si alloy, Fe—Rh alloy, Fe—V alloy, Fe—Cu alloy, Fe—Au alloy, Co—P alloy, Co—V alloy, Co—Si alloy, Co—Y alloy, Co—La alloy, Co—Ce alloy, Co—Pr alloy, Co—Sm alloy, Co—Mn alloy, Co—Pt alloy, Ni—Cu alloy, Co—Ni—Fe alloy, Co—Ni—Ag alloy, Co—Ni—Zn alloy, Co—Si—Al alloy, and Fe—Si—Al alloy.

12. The process according to claim 11 wherein said magnetic metal is Co or Co—Ni alloy containing not less than 30% by weight of Ni.

* * * * *